(12) United States Patent
Lee et al.

(10) Patent No.: US 12,021,224 B2
(45) Date of Patent: Jun. 25, 2024

(54) LITHIUM-SULFUR SECONDARY BATTERY

(71) Applicant: LG CHEM, LTD., Seoul (KR)

(72) Inventors: Changhoon Lee, Daejeon (KR); Doo Kyung Yang, Daejeon (KR); Intae Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 688 days.

(21) Appl. No.: 17/265,346

(22) PCT Filed: Nov. 18, 2019

(86) PCT No.: PCT/KR2019/015731
§ 371 (c)(1),
(2) Date: Feb. 2, 2021

(87) PCT Pub. No.: WO2020/105980
PCT Pub. Date: May 28, 2020

(65) Prior Publication Data
US 2021/0328209 A1    Oct. 21, 2021

(30) Foreign Application Priority Data

Nov. 22, 2018 (KR) .......................... 10-2018-0145531
Dec. 13, 2018 (KR) .......................... 10-2018-0160599
(Continued)

(51) Int. Cl.
*H01M 10/0525* (2010.01)
*H01M 4/133* (2010.01)
(Continued)

(52) U.S. Cl.
CPC ........... *H01M 4/362* (2013.01); *H01M 4/133* (2013.01); *H01M 4/134* (2013.01); *H01M 4/38* (2013.01);
(Continued)

(58) Field of Classification Search
CPC ...... H01M 4/362; H01M 4/133; H01M 4/134; H01M 4/38
See application file for complete search history.

(56) References Cited

U.S. PATENT DOCUMENTS 6,194,099 B1 * 2/2001 Gernov ................. H01M 4/625
29/623.5
2003/0113624 A1    6/2003 Kim et al.
(Continued)

FOREIGN PATENT DOCUMENTS

CN          1427494 A      7/2003
CN        103339770 A     10/2013
(Continued)

OTHER PUBLICATIONS

Cuisiner et al., "Unique behaviour of nonsolvents for polysulphides in lithium-sulphur batteries," Energy & Environmental Science, vol. 7, 2014, pp. 2697-2705.
(Continued)

*Primary Examiner* — Olatunji A Godo
(74) *Attorney, Agent, or Firm* — Birch, Stewart, Kolasch & Birch, LLP

(57) ABSTRACT

A lithium-sulfur secondary battery is disclosed, and in particular, a lithium-sulfur secondary battery in which a positive electrode includes a sulfur-carbon composite including a microporous carbon material and sulfur, or a conductive additive including a carbon material having high specific surface area. By specifying conditions of the positive electrode and an electrolyte liquid, energy density may be enhanced compared to existing lithium-sulfur secondary batteries.

18 Claims, 9 Drawing Sheets

(30) Foreign Application Priority Data

Nov. 14, 2019 (KR) .................. 10-2019-0145596
Nov. 14, 2019 (KR) .................. 10-2019-0145598

(51) Int. Cl.
*H01M 4/134* (2010.01)
*H01M 4/36* (2006.01)
*H01M 4/38* (2006.01)
*H01M 10/056* (2010.01)
*H01M 4/02* (2006.01)

(52) U.S. Cl.
CPC ..... *H01M 10/0525* (2013.01); *H01M 10/056* (2013.01); *H01M 2004/021* (2013.01); *H01M 2004/028* (2013.01); *H01M 2300/0037* (2013.01)

(56) References Cited

U.S. PATENT DOCUMENTS

| | | | |
|---|---|---|---|
| 2013/0330619 | A1 | 12/2013 | Archer et al. |
| 2014/0272610 | A1 | 9/2014 | Amine et al. |
| 2015/0086877 | A1 | 3/2015 | Yamazaki et al. |
| 2015/0221949 | A1 | 8/2015 | Liang et al. |
| 2016/0181600 | A1 | 6/2016 | Omoda et al. |
| 2016/0233492 | A1 | 8/2016 | Yin et al. |
| 2017/0352873 | A1 | 12/2017 | Korzhenko et al. |
| 2018/0159121 | A1 | 6/2018 | Guo et al. |
| 2019/0123377 | A1 | 4/2019 | Yang et al. |
| 2021/0104745 | A1* | 4/2021 | Park .................. H01M 10/056 |

FOREIGN PATENT DOCUMENTS

| | | |
|---|---|---|
| CN | 103700859 A | 4/2014 |
| CN | 104247138 A | 12/2014 |
| CN | 105594022 A | 5/2016 |
| CN | 106058173 A | 10/2016 |
| CN | 107112508 A | 8/2017 |
| CN | 108701870 A | 10/2018 |
| JP | 2014-502405 A | 1/2014 |
| JP | 2016-119165 A | 6/2016 |
| JP | 2018-503945 A | 2/2018 |
| KR | 10-2003-0051143 A | 6/2003 |
| KR | 10-1379716 B1 | 3/2014 |
| KR | 10-2016-0037084 A | 4/2016 |
| KR | 10-2018-0017975 A | 2/2018 |
| KR | 10-2018-0042157 A | 4/2018 |
| KR | 10-2018-0057437 A | 5/2018 |
| KR | 10-2018-0102406 A | 9/2018 |
| WO | WO 2013/157503 A1 | 10/2013 |
| WO | WO 2017/123544 A1 | 7/2017 |

OTHER PUBLICATIONS

Extended European Search Report for European Application No. 19887865.4, dated Jun. 8, 2021.
Sohn et al., "Porous spherical polyacrylonitrile-carbon nanocomposite with high loading of sulfur for lithium-sulfur batteries," Journal of Power Sources, vol. 302, 2016 (published online Oct. 24, 2015), pp. 70-78.
Weng et al., "Ultrasound Assisted Design of Sulfur/Carbon Cathodes with Partially Fluorinated Ether Electrolytes for Highly Efficient Li/S Batteries," Advanced Materials, vol. 25, 2013, pp. 1608-1615.
Xu et al., "Mesoporous Carbon-Carbon Nanotube-Sulfur Composite Microspheres for High-Areal-Capacity Lithium-Sulfur Battery Cathodes," Applied Materials & Interfaces, vol. 5, 2013, pp. 11355-11362.
Yang et al., "Structural Design of Lithium-Sulfur Batteries: From Fundamental Research to Practical Application," Electrochemical Energy Reviews, vol. 1, 2018, pp. 239-293.
Cheng et al., "Sparingly Solvating Electrolytes for High Energy Density Lithium-Sulfur Batteries", ACS Energy Letters, 2016, 1, 3, 503-509, total 22 pages.
Fotouhi et al., "Lithium-Sulfur Battery Technology Readiness and Applications—A Review", Energies 2017, vol. 10, No. 12, 1937, total 15 pages.
International Search Report for PCT/KR2019/015731 dated Feb. 25, 2020.
Lee et al., "Directing the Lithium-Sulfur Reaction Pathway via Sparingly Solvating Electrolytes for High Energy Density Batteries", ACS Cent. Sci. 2017, vol. 3, pp. 605-613.
Piwko et al., "Symmetric Lithium Sulfide—Sulfur Cells: A Method to Study Degradation Mechanisms of Cathode, Separator and Electrolyte Concepts for Lithium-Sulfur Batteries", Journal of the Electrochemical Society, 2018, vol. 165, No. 5, pp. A1084-A1091.

\* cited by examiner

LITHIUM-SULFUR SECONDARY BATTERY

TECHNICAL FIELD

This application claims the benefit of Korean Patent Application No. 10-2018-0145531 on Nov. 22, 2018, Korean Patent Application No. 10-2018-0160599 on Dec. 13, 2018, Korean Patent Application No. 10-2019-0145596 on Nov. 14, 2019, and Korean Patent Application No. 10-2019-0145598 on Nov. 14, 2019 with the Korean Intellectual Property Office, the disclosure of which are herein incorporated by reference in their entirety.

The present invention relates to a lithium-sulfur secondary battery.

BACKGROUND ART

As application areas of secondary batteries expand to electric vehicles (EV), energy storage systems (ESS) or the like, lithium-ion secondary batteries having relatively low weight to energy storage density (~250 Wh/kg) have limits in applications for such products. On the other hand, a lithium-sulfur secondary battery has high theoretical energy density (~2,600 Wh/kg), and thereby has received attention as a next generation secondary battery technology.

A lithium-sulfur secondary battery is a battery system using a sulfur-based material having a sulfur-sulfur bond as a positive electrode active material, and lithium metal as a negative electrode active material. Such a lithium-sulfur secondary battery has advantages in that sulfur, a main material of the positive electrode active material, is very abundant in resources globally, has no toxicity and has a low atomic weight.

During discharge of a lithium-sulfur secondary battery, lithium, a negative electrode active material, is oxidized while releasing electrons and being ionized, and a sulfur-based material, a positive electrode active material, is reduced by receiving the electrons. At this time, the oxidation reaction of lithium is a process in which lithium metal releases electrons and changes into a lithium cation form. In addition, the reduction reaction of sulfur is a process in which a sulfur-sulfur bond receives two electrons and changes into a sulfur anion form. The lithium cation produced through the oxidation reaction of lithium is transferred to a positive electrode through an electrolyte, and forms a salt by bonding with the sulfur anion produced through the reduction reaction of sulfur. Specifically, sulfur before discharge has a cyclic $S_8$ structure, and this changes to lithium polysulfide ($Li_2S_x$, x=8, 6, 4, 2) through the reduction reaction, and when such lithium polysulfide is fully reduced, lithium sulfide ($Li_2S$) is eventually produced.

Due to low electric conductivity of sulfur, a positive electrode active material, reactivity with electrons and lithium ions is difficult to secure in a solid-state form. In order to improve such reactivity of sulfur, conventional lithium-sulfur secondary batteries produce intermediate polysulfide in a $Li_2S_x$ form to induce a liquid-state reaction and improve reactivity. Herein, an ether-based solvent such as dioxolane or dimethoxyethane having high solubility for lithium polysulfide is used as a solvent of an electrolyte liquid. In addition, conventional lithium-sulfur secondary batteries build a catholyte-type lithium-sulfur secondary battery system to improve reactivity, and in this case, sulfur reactivity and lifetime properties are affected by the electrolyte liquid content due to properties of lithium polysulfide readily dissolved in the electrolyte liquid. In addition, lean electrolyte conditions are essential for high energy density, however, a lithium polysulfide concentration increases in the electrolyte liquid as the electrolyte liquid decreases making normal battery driving difficult due to a decrease in the active material mobility and an increase in the side reaction.

Such lithium polysulfide elution adversely affects battery capacity and lifetime properties, and various technologies for suppressing lithium polysulfide elution have been proposed.

As one example, Korean Patent Application Publication No. 2016-0037084 discloses that using a carbon nanotube aggregate having a three-dimensional structure coated with graphene as a carbon material may prevent polysulfide elution, and enhance conductivity of a sulfur-carbon nanotube composite.

In addition, Korean Patent No. 1379716 discloses that, by using a sulfur-including graphene composite, which is prepared through a method of treating graphene with hydrofluoric acid to form a pore on the graphene surface, and growing sulfur particles in the pore, as a positive electrode active material, lithium polysulfide elution is suppressed and as a result, a decrease in the battery capacity may be minimized.

By varying structures or materials of a sulfur-carbon composite used as a positive electrode active material, these patents have somewhat improved a problem of performance decline in a lithium-sulfur secondary battery through preventing lithium polysulfide elution, however, the effects are not sufficient. Accordingly, in order to build a lithium-sulfur secondary battery with high energy density, a battery system capable of driving a high loading and low porosity electrode is required, and studies on such a battery system have been continuously conducted in the art.

PRIOR ART DOCUMENTS

Patent Documents

Korean Patent Application Publication No. 2016-0037084 (2016 Apr. 5), SULFUR-CARBONNANOTUBE COMPLEX, METHOD OF PREPARING THE SAME, CATHODE ACTIVE MATERIAL FOR LITHIUM-SULFUR BATTERY INCLUDING THE SAME, AND LITHIUM-SULFUR BATTERY INCLUDING THE SAME Korean Patent No. 1379716 (2014 Mar. 25), LITHIUM-SULFUR SECONDARY BATTERY HAVING POSITIVE ELECTRODE WHICH IS CONSTRUCTED WITH GRAPHENE COMPOSITE INCLUDING SULFUR, AND A FORMING METHOD THEREOF

Non-Patent Document

Abbas Fotouhi et al., Lithium-Sulfur Battery Technology Readiness and Applications-A Review, *Energies* 2017, 10, 1937

DISCLOSURE

Technical Problem

As a result of extensive studies in view of the above, the inventors of the present invention have identified that a high energy density lithium-sulfur secondary battery is obtained by adjusting a positive electrode and an electrolyte liquid to be under specific conditions, and have completed the present invention.

Accordingly, an aspect of the present invention provides a lithium-sulfur secondary battery having excellent energy density.

Technical Solution

According to an aspect of the present invention, one embodiment of the present invention provides a lithium-sulfur secondary battery including a positive electrode, a negative electrode, a separator, and an electrolyte liquid, wherein the positive electrode includes a sulfur-carbon composite comprising a microporous carbon material and sulfur, and the positive electrode has an SC factor value represented by the following Mathematical Formula 1 of 0.45 or greater:

$$SC \text{ factor} = \alpha \times \frac{L}{P} \quad \text{[Mathematical Formula 1]}$$

in Mathematical Formula 1, P, L and α follow descriptions in the specification.

The microporous carbon material may include pores having an average diameter of from 1 nm to 10 nm.

The microporous carbon material may have a specific surface area of from 500 m²/g to 4500 m²/g.

The microporous carbon material may have porosity of from 10% to 90%.

The microporous carbon material may have a pore volume of from 0.8 cm³/g to 5 cm³/g.

The sulfur may include at least one selected from the group consisting of inorganic sulfur, $Li_2S_n$ (n≥1), a disulfide compound, an organosulfur compound, and a carbon-sulfur polymer.

The sulfur may be included in an amount of from 50% by weight to 90% by weight based on the total weight of the sulfur-carbon composite.

According to another embodiment of the present invention, there is provided a lithium-sulfur secondary battery including a positive electrode, a negative electrode, a separator, and an electrolyte liquid, wherein the positive electrode includes a conductive additive comprising a carbon material having high specific surface area, and the positive electrode has an SC factor value represented by the following Mathematical Formula 1 of 0.45 or greater:

$$SC \text{ factor} = \alpha \times \frac{L}{P} \quad \text{[Mathematical Formula 1]}$$

in Mathematical Formula 1, P, L and α follow descriptions in the specification.

The carbon material having high specific surface area may have a specific surface area of from 100 m²/g to 500 m²/g.

The carbon material having high specific surface area may include at least one selected from the group consisting of carbon nanotubes, graphene, carbon black, and carbon fiber.

The carbon material having high specific surface area may be included in an amount of from 0.01% by weight to 30% by weight based on the total weight of the positive electrode active material layer.

The electrolyte liquid includes a solvent and a lithium salt, and the solvent may include a first solvent having a $DV^2$ factor value represented by the following Mathematical Formula 2 of 1.75 or less, and a second solvent that is a fluorinated ether-based solvent:

$$DV^2 \text{ factor} = \gamma \times \frac{\mu}{DV} \quad \text{[Mathematical Formula 2]}$$

in Mathematical Formula 2, DV, μ and γ follow descriptions in the specification.

The first solvent may have a $DV^2$ factor value of 1.5 or less.

The lithium-sulfur secondary battery may have an NS factor value represented by the following Mathematical Formula 3 of 3.5 or less:

$$NS \text{ factor} = \frac{DV^2 \text{ factor}}{SC \text{ factor}} \quad \text{[Mathematical Formula 3]}$$

in Mathematical Formula 3, SC factor and $DV^2$ factor follow descriptions in the specification.

The lithium-sulfur secondary battery may have an ED factor value represented by the following Mathematical Formula 4 of 850 or greater:

$$ED \text{ factor} = V \times SC \text{ factor} \times \frac{C}{D} \quad \text{[Mathematical Formula 4]}$$

in Mathematical Formula 4, V, SC factor, C and D follow descriptions in the specification.

The first solvent may include at least one selected from the group consisting of propionitrile, dimethylacetamide, dimethylformamide, gamma-butyrolactone, triethylamine, and 1-iodopropane.

The second solvent may include at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

The solvent may include the first solvent in an amount of from 1% by weight to 50% by weight based on the total weight of the solvent.

The solvent may include the second solvent in an amount of from 50% by weight to 99% by weight based on the total weight of the solvent.

The solvent may include the first solvent and the second solvent in a weight ratio of from 3:7 to 1:9.

Advantageous Effects

By adjusting a positive electrode and an electrolyte liquid to be under specific conditions, a lithium-sulfur secondary battery according to the present invention exhibits high energy density, which has been difficult to obtain with conventional lithium-sulfur secondary batteries.

BEST MODE

Figure 1:
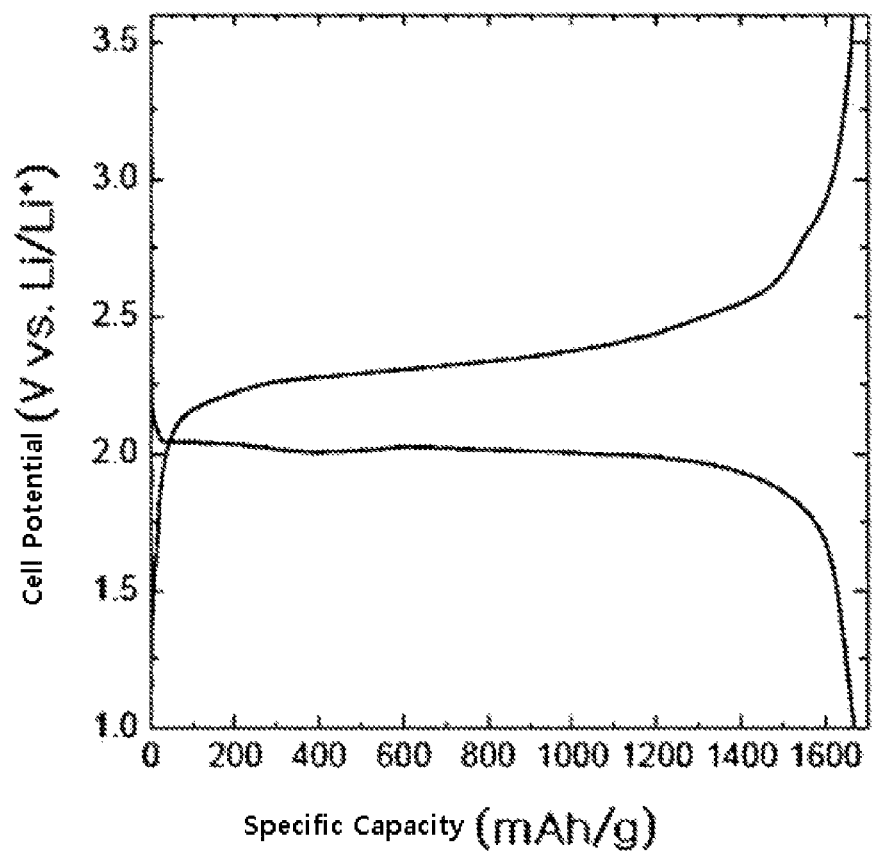
FIG. 1 is a graph showing a result of performance evaluation on Example 1 according to Experimental Example 1 of the present invention.
Figure 2:
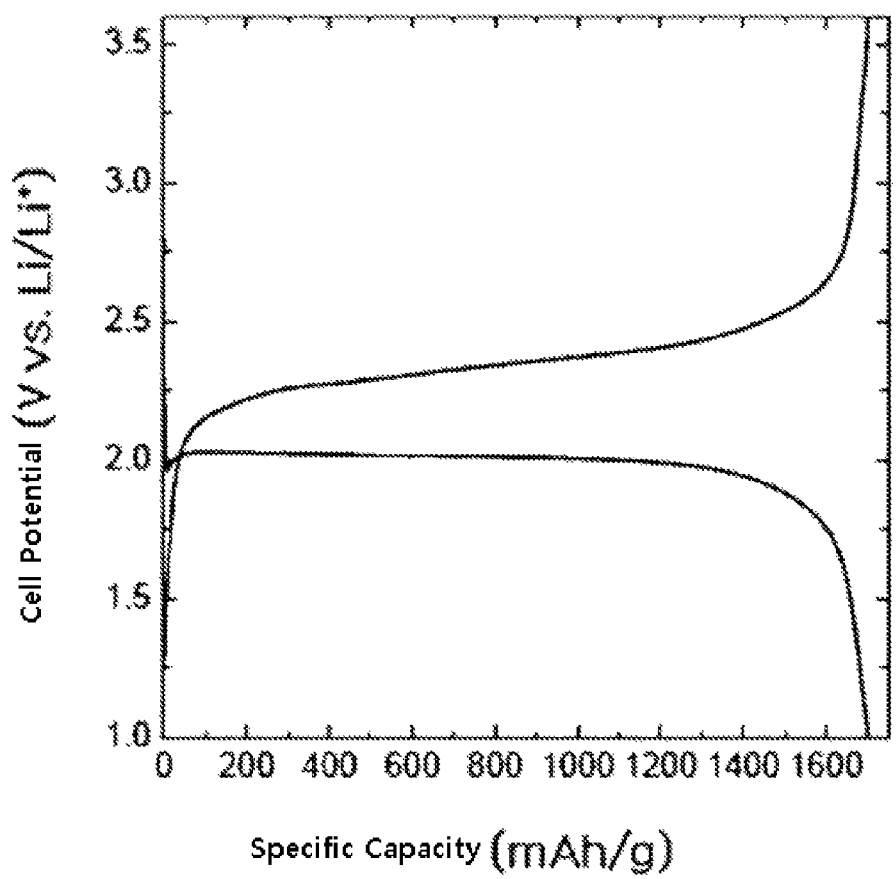
FIG. 2 is a graph showing a result of performance evaluation on Example 2 according to Experimental Example 1 of the present invention.
Figure 3:
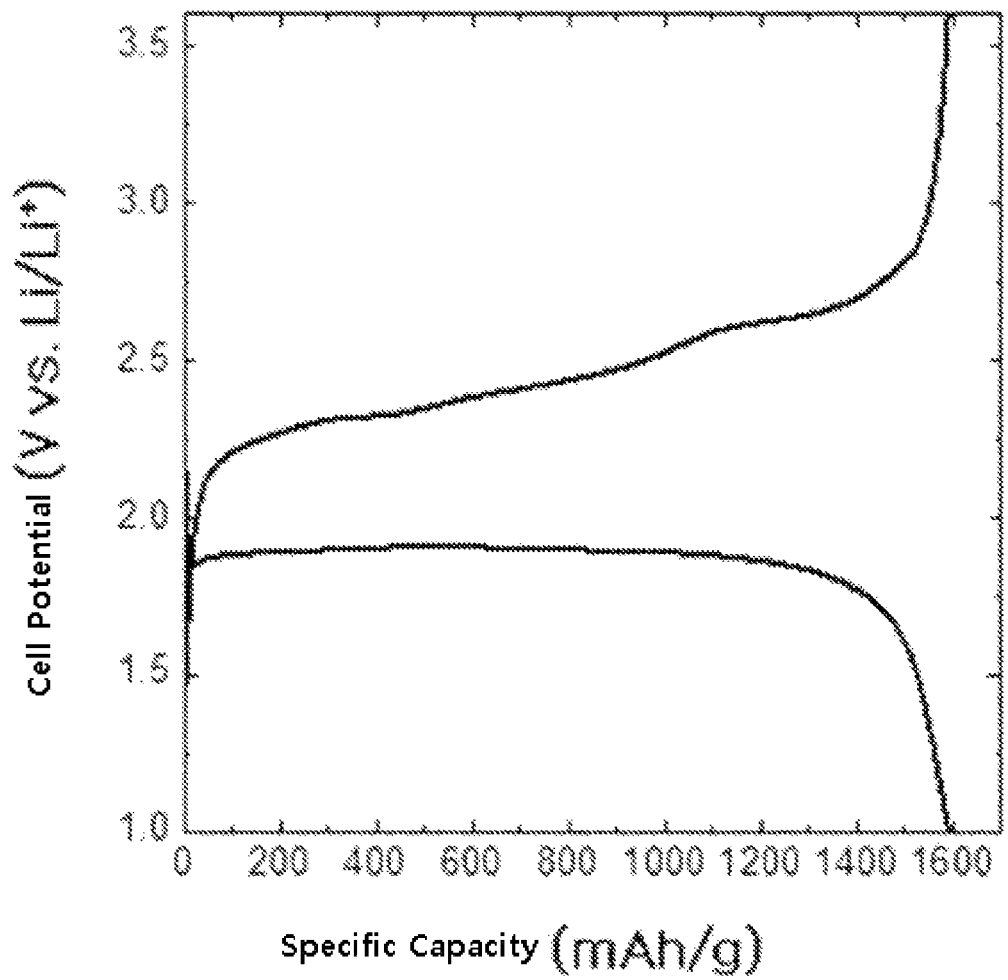
FIG. 3 is a graph showing a result of performance evaluation on Example 3 according to Experimental Example 1 of the present invention.
Figure 4:
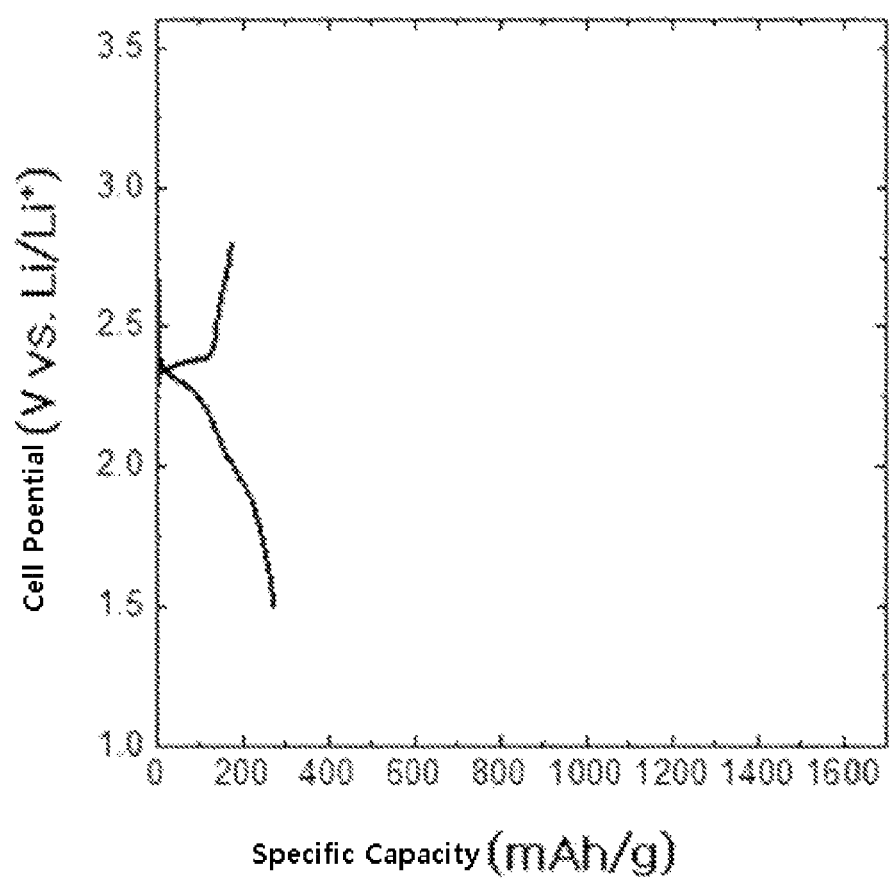
FIG. 4 is a graph showing a result of performance evaluation on Comparative Example 1 according to Experimental Example 1 of the present invention.

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Terms used in the present invention are for describing specific embodiments only and do not intend to limit the present inventive. Singular forms used herein include plural forms as well, unless the context clearly indicates otherwise. In the present invention, terms such as 'include' or 'have' are to specify the presence of features, numbers, steps, behaviors, constituents, components or combinations thereof described in the specification, and need to be construed as not excluding the possibility of presence or addition of one or more of other features, numbers, steps, behaviors, constituents, components or combinations thereof in advance.

The term "composite" used in the present specification means a material combining at least two materials, and exhibiting more effective functions while forming physically and chemically different phases.

The term "polysulfide" used in the present specification is a concept including both "polysulfide ion ($S_x^{2-}$, x=8, 6, 4, 2))" and "lithium polysulfide ($Li_2S_x$ or $LiS_x^-$ x=8, 6, 4, 2)".

For properties described in the present specification, when measuring condition and method are not specifically described, the properties are measured using measuring conditions and methods generally used by those skilled in the art.

A lithium-sulfur secondary battery produces electric energy using an oxidation-reduction reaction in which an oxidation number of sulfur decreases as a sulfur-sulfur bond is broken during discharge, a reduction reaction, and an oxidation number of sulfur increases as a sulfur-sulfur bond is formed again during charge, an oxidation reaction.

A lithium-sulfur secondary battery has high discharge capacity and energy density among various lithium secondary batteries, and has received attention as a next-generation secondary battery with an advantage of sulfur used as a positive electrode active material being abundant in resources and low-priced lowering manufacturing costs of the battery, and being environmental-friendly.

Despite such advantages, sulfur, a positive electrode active material, is a non-conductive material, and a sulfur-carbon composite compositing with a carbon material, a conductive material, is generally used in order to compensate this.

However, in conventional lithium-sulfur secondary battery systems, lithium polysulfide elution described above is not able to be suppressed causing sulfur loss, and as a result, theoretical discharge capacity and theoretical energy density are not fully obtained in actual driving since the amount of sulfur participating in an electrochemical reaction rapidly decreases. In addition, as well as being floated or precipitated in an electrolyte liquid, lithium polysulfide eluted as above directly reacts with lithium, and is fixed on a negative electrode surface in $Li_2S$ form causing a problem of corroding a lithium metal negative electrode.

In order to suppress lithium polysulfide elution, carbon materials having various structures and materials such as introducing a coating layer to a carbon material or forming a pore have been proposed, however, battery performance has not been effectively improved.

In view of the above, the present invention provides a lithium-sulfur secondary battery including a positive electrode, a negative electrode, a separator, and an electrolyte liquid, and provides a positive electrode having, by including a sulfur-carbon composite comprising a microporous carbon material and sulfur as a positive electrode active material, or a carbon material having high specific surface area as a conductive additive, low porosity and high loading amount of sulfur, a positive electrode active material. When lowering porosity and increasing a positive electrode active material content in a positive electrode in the case of a general secondary battery, energy density of a secondary battery including the positive electrode increases. However, when decreasing porosity of a positive electrode to a minimum and increasing a content of sulfur to a maximum in a lithium-sulfur secondary battery, a ratio of an electrolyte liquid per unit sulfur content decreases, and target performance is difficult to obtain when using the above-described positive electrode in the lithium-sulfur secondary battery. Accordingly, one embodiment of the present invention provides a lithium-sulfur secondary battery having higher energy density than conventional lithium-sulfur secondary batteries in actual driving by using a sulfur-carbon composite including a microporous structured-carbon material as a positive electrode active material, and limiting conditions relating to sulfur in a positive electrode and specifying a matching electrolyte liquid condition.

The positive electrode according to the present invention may include a positive electrode current collector, and a positive electrode active material layer coated on one surface or both surfaces of the positive electrode current collector.

The positive electrode current collector is not particularly limited as long as it supports a positive electrode active material, and has high conductivity without inducing chemical changes to the corresponding battery. For example, copper, stainless steel, aluminum, nickel, titanium, palladium, baked carbon, copper or stainless steel of which surface is treated with carbon, nickel, silver or the like, aluminum-cadmium alloys and the like may be used.

The positive electrode current collector may strengthen binding strength with the positive electrode active material by forming micro unevenness on a surface thereof, and various forms such as films, sheets, foil, meshes, nets, porous bodies, foams or non-woven fabrics may be used.

The thickness of the positive electrode current collector is not particularly limited, but may be, for example, from 3 μm to 500 μm.

The positive electrode active material layer may include a positive electrode active material, and selectively, a conductive additive and a binder.

The positive electrode active material includes a sulfur-based compound. The sulfur-based compound may include at least one selected from the group consisting of inorganic sulfur ($S_8$), $Li_2S_n$ (n≥1), disulfide compounds such as 2,5-dimercapto-1,3,4-thiadiazole or 1,3,5-trithiocyanuic acid, organosulfur compounds, and carbon-sulfur polymers $((C_2S_x)_n,$ x=2.5 to 50, n≥2). Preferably, inorganic sulfur ($S_8$) may be used.

The sulfur-based compound alone does not have electric conductivity, and therefore, may be composited with a carbon material, a conductive material.

In the present invention, the positive electrode active material may be a sulfur-carbon composite comprising a carbon material and sulfur, and the carbon may comprise a microporous carbon material having micropores.

The microporous carbon material provides a skeleton capable of uniformly and stably fixing sulfur, the positive electrode active material, and allows an electrochemical reaction of sulfur to smoothly progress.

Particularly, one embodiment of the present invention uses a carbon material having high specific surface area and porosity by including a number of micropores as a carrier of the sulfur-carbon composite, and as a result, the sulfur and the electrolyte liquid show solid-solid (solid-state) reactivity in a lithium-sulfur secondary battery system including an electrolyte liquid to describe below leading to enhanced capacity properties.

The microporous carbon material may be generally prepared by carbonizing a precursor of various carbon materials. The microporous carbon material includes a number of pores on the surface and the inside, and in the present invention, may include micropores having an average diameter of from 1 nm to 10 nm, and porosity may be in a range of from 10% to 90%.

When the micropores have an average diameter of less than the above-mentioned range, the pore size is merely a molecular level making sulfur impregnation impossible, and when the micropores have an average diameter of greater than the above-mentioned range, the carbon material may not have a high specific surface area.

The microporous carbon material may have a specific surface area of from 500 $m^2/g$ to 4500 $m^2/g$, and preferably from 800 $m^2/g$ to 4000 $m^2/g$. Herein, the specific surface area may be measured through a common Brunauer & Emmett & Teller (BET) method. The specific surface area of the microporous carbon material being less than the above-mentioned range has a problem of reactivity decrease due to a decrease in the contact area with the sulfur, and the specific surface area being greater than the above-mentioned range on the contrary may have problems of an increase in the side reaction caused by the excessive specific surface area and increasing an added amount of a binder required for preparing positive electrode slurry.

The microporous carbon material may have a pore volume of from 0.8 $cm^3/g$ to 5 $cm^3/g$ and preferably from 1 $cm^3/g$ to 4.5 $cm^3/g$. Herein, the pore volume may be measured through a common BET method. When the pore volume of the microporous carbon material is less than the above-mentioned range, sulfur is not favorably impregnated into the pore structure, and the pore volume being greater than the above-mentioned range on the contrary may have a problem of increasing electrode porosity, which leads to an increase in the electrolyte liquid amount required to fill the pores making it difficult to accomplish high energy density.

Carbon materials used in conventional sulfur-carbon composites, particularly carbon nanotubes, commonly have a specific surface area in a range of from 50 $m^2/g$ to 400 $m^2/g$ meaning almost no micropore volume present, whereas the microporous carbon material of the present invention has high specific surface area and micropore volume increasing a contact area between the carbon material and sulfur, which is effective in improving the solid state reactivity of sulfur described above.

The form of the microporous carbon material may be a globular type, a rod type, a needle type, a plate type, a fiber type, a tube type or a bulk type, and may be used without limit as long as it is commonly used in a lithium-sulfur secondary battery.

In the sulfur-carbon composite of the present invention, the sulfur may be included in an amount of from 50% by weight to 90% by weight, and preferably in an amount of from 60% by weight to 80% by weight based on the total weight of the sulfur-carbon composite.

In the sulfur-carbon composite of the present invention, the microporous carbon material may be included in an amount of from 10% by weight to 50% by weight, and preferably in an amount of from 20% by weight to 40% by weight based on the total weight of the sulfur-carbon composite.

Accordingly, a weight ratio of the porous carbon material and the sulfur may be from 1:1 to 1:9 and preferably from 1:1.5 to 1:4 in the sulfur-carbon composite. When the weight ratio is less than the above-mentioned range, an added amount of a binder required for preparing positive electrode slurry increases as the porous carbon material content increases. Such an increase in the added amount of a binder resultantly increases sheet resistance of an electrode performing a role of an insulator preventing electron migration (electron pass), and cell performance may decline therefrom. On the contrary, when the weight ratio is greater than the above-mentioned range, sulfurs aggregate by themselves, and direct participation in an electrode reaction may become difficult since the sulfur is difficult to receive electrons.

The sulfur-carbon composite may be composited by simply mixing the sulfur and the microporous carbon material described above, or may have a core-shell structured coating form or a supported form. The core-shell structured coating form means any one of the sulfur or the microporous carbon material coating the other material, and may be, for example, the microporous carbon material surface being covered by the sulfur or vice versa. In addition, the supported form may be a form of supporting sulfur inside the microporous carbon. The sulfur-carbon composite may have any form as long as it satisfies the content ratio of the sulfur and the microporous carbon material provided above, and the form is not limited in the present invention.

An average diameter of the sulfur-carbon composite according to the present invention is not particularly limited in the present invention and may vary, but is from 0.5 μm to 20 μm and preferably from 1 μm to 15 μm. Satisfying the above-mentioned range has an advantage of preparing a high loading electrode.

The positive electrode active material may further include, in addition to the above-described composition, one or more additives selected from among transition metal elements, group IIIA elements, group IVA elements, sulfur compounds of these elements, and alloys of these elements and sulfur.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The conductive additive is a material connecting an electrolyte and a positive electrode active material to perform a role of a path through which electrons migrate from a current collector to the positive electrode active material, and materials promoting a smooth electrochemical reaction of sulfur, the positive electrode active material, and having conductivity may be used without limit.

For example, as the conductive additive, carbon black such as Super-P, denka black, acetylene black, ketjen black, channel black, furnace black, lamp black, thermal black or carbon black; carbon derivatives such as carbon nanotubes, graphene or fullerene; conductive fibers such as carbon fiber or metal fibers; fluorocarbon; metal powders such as aluminum powder and nickel powder; or conductive polymers such as polyaniline, polythiophene, polyacetylene or polypyrrole may be used either alone or as a mixture.

As another embodiment, the present invention may provide a lithium-sulfur battery in a form of including a positive electrode comprising a carbon material having a higher specific surface area than a conventional conductive material as a conductive additive. By limiting a condition relating to sulfur in such a positive electrode and specifying a matching electrolyte liquid condition, the lithium-sulfur battery according to the present invention may accomplish energy density to a higher level in actual driving compared to conventional lithium-sulfur secondary batteries.

In another embodiment of the present invention, the conductive additive has a higher specific surface area compared to common carbon black and carbon fiber series conductive additive.

Particularly, by using a carbon material having high specific surface area as a conductive additive in another embodiment of the present invention, enhanced capacity properties are obtained by improving reactivity of a positive electrode active material in a secondary battery system of a lithium-sulfur battery including an electrolyte liquid to describe below.

Whereas a conventional conductive additive used in a lithium-sulfur secondary battery, for example, vapor grown carbon fiber (VGCF), normally has a specific surface area in a range of from 10 $m^2/g$ to 50 $m^2/g$, the carbon material according to another embodiment of the present invention has a higher specific surface area and thereby increases a contact area with a positive electrode active material, which is effective in improving the reactivity of a positive electrode described above.

The carbon material having high specific surface area may have a specific surface area of from 100 $m^2/g$ to 500 $m^2/g$, and preferably from 150 $m^2/g$ to 400 $m^2/g$. Herein, the specific surface area may be measured through a common BET method. The specific surface area of the carbon material being less than the above-mentioned range has a problem of decreasing electrode conductivity since forming a conductive structure in the electrode is difficult, and the specific surface area being greater than the above-mentioned range on the contrary may have a problem of increasing an added amount of a binder required for preparing positive electrode active material slurry due to an increase in the specific surface area of the solid material.

The carbon material having high specific surface area may be used without limit as long as it has conductivity. For example, the carbon material having high specific surface area may include, as materials having the specific surface area range described above, at least one selected from the group consisting of carbon nanotubes, graphene, carbon black, and carbon fiber. Preferably, the carbon material having high specific surface area may be at least one selected from the group consisting of carbon nanotubes and graphene.

In the present invention, when including carbon nanotubes and graphene as the conductive additive among the carbon materials having high specific surface area, the carbon nanotubes and the graphene may have a weight ratio of from 0:10 to 10:0, and preferably from 1:9 to 9:1. The graphene increases adhesive strength between positive electrode active materials, and the carbon nanotubes is advantageous for forming a conductive structure in small space due to a small diameter, and therefore, the carbon nanotubes and the graphene are preferably mixed in the weight ratio range described above.

The conductive additive may be included in an amount of from 0.01% by weight to 30% by weight based on the total weight of the mixture including the positive electrode active material.

The binder is for keeping the positive electrode active material on the positive electrode current collector, and organically linking the positive electrode active materials to further increase binding force between them, and all binders known in the art may be used.

Example of the binder may include one type selected from the group consisting of fluorine resin-based binders including polyvinylidene fluoride (PVdF) or polytetrafluoroethylene (PTFE); rubber-based binders including styrene butadiene rubber (SBR), acrylonitrile-butadiene rubber or styrene-isoprene rubber; cellulose-based binders including carboxyl methyl cellulose (CMC), starch, hydroxypropyl cellulose or regenerated cellulose; polyalcohol-based binders; polyolefin-based binders including polyethylene or polypropylene; polyimide-based binders; polyester-based binders; and silane-based binders, or mixtures or copolymers of two or more types thereof.

The binder may be included in an amount of from 0.5% by weight to 30% by weight based on the total weight of the mixture including the positive electrode active material. When the binder content is less than 0.5% by weight, physical properties of the positive electrode decline eliminating the active material and the conductor in the positive electrode, and when the content is greater than 30% by weight, a ratio of the active material and the conductor relatively decreases in the positive electrode reducing battery capacity.

The positive electrode may be prepared using common methods known in the art. For example, the positive electrode may be prepared by preparing slurry by mixing a solvent, and, as necessary, additives such as a binder, a conductive material and a filler to a positive electrode active material and stirring the result, then coating the slurry on a current collector made of a metal material, and compressing and drying the result.

Specifically, the binder is dissolved in a solvent for preparing slurry first, and then a conductive additive is dispersed thereinto. As the solvent for preparing the slurry, those capable of uniformly dispersing the positive electrode active material, the binder and the conductive additive and readily evaporating are preferably used, and typical examples thereof may include acetonitrile, methanol, ethanol, tetrahydrofuran, water, isopropyl alcohol and the like. Next, the positive electrode active material, or selectively together with the additives, is uniformly dispersed again in the conductive additive-dispersed solvent to prepare positive electrode slurry. The amounts of the solvent, the positive electrode active material, or, selectively, the additives included in the slurry do not carry an important meaning in the present application, and it is sufficient that the slurry has proper viscosity to be readily coated. The slurry prepared as above is coated on a current collector, and dried to form a positive electrode. The slurry may be coated on a current collector to a proper thickness depending on the slurry viscosity and the thickness of the positive electrode to form.

The coating may be conducted using methods commonly known in the art, and for example, the positive electrode active material slurry is distributed on an upper surface of one side of the positive electrode current collector, and uniformly dispersing the slurry using a doctor blade or the like. In addition thereto, the coating may be conducted using a method such as die casting, comma coating or screen printing.

The drying is not particularly limited, but may be conducted within 1 day in a vacuum oven of from 50° C. to 200° C.

The positive electrode of the present invention prepared using the above-described materials and methods may be classified by an SC factor value represented by the following Mathematical Formula 1.

$$SC \text{ factor} = \alpha \times \frac{L}{P} \qquad \text{[Mathematical Formula 1]}$$

In Mathematical Formula 1,

P is porosity (%) of the positive electrode active material layer in the positive electrode, L is a sulfur mass (mg/cm$^2$) per unit area of the positive electrode active material layer in the positive electrode, and α is 10 (constant).

The lithium-sulfur secondary battery according to the present invention accomplishes high energy density by an organic binding of, as well as the positive electrode described above, a negative electrode, a separator, an electrolyte and the like, and according to the present invention, in order for the lithium-sulfur secondary battery to accomplish high energy density, the SC factor value may be 0.45 or greater, and preferably 0.5 or greater. Although an upper limit of the SC factor value is not particularly limited in the present invention, the SC factor value may be 4.5 or less when considering actual driving of the lithium-sulfur secondary battery. In conventional lithium-sulfur secondary batteries, performance such as energy density of the battery declines when the SC factor value is 0.45 or greater, however, in the lithium-sulfur secondary battery according to the present invention, battery performance is maintained without declining in actual driving.

The negative electrode according to the present invention may be formed with a negative electrode current collector, and a negative electrode active material layer formed on one surface or both surfaces thereof. Alternatively, the negative electrode may be a lithium metal plate.

The negative electrode active material layer may include a negative electrode active material, and selectively, a conductive material and a binder.

As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium (Li) and metals selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

As for constitutions of the current collector, the conductive material, the binder and the like other than the negative electrode active material and a method for preparing a negative electrode, the materials, the methods and the like used in the positive electrode described above may be used.

The separator according to the present invention is a physical separator having a function of physically separating the positive electrode and the negative electrode, and is not particularly limited as long as it is used as a common separator, and those having an excellent electrolyte liquid moisture-containing ability while having low resistance for ion migration of the electrolyte liquid are particularly preferred.

In addition, the separator enables lithium ion transport between the positive electrode and the negative electrode while separating or insulating the positive electrode and the negative electrode from each other. Such a separator may be formed with porous, that is, 30% to 50% porosity, and non-conductive or insulating materials.

Specifically, porous polymer films, for example, porous polymer films prepared with a polyolefin-based polymer such as an ethylene homopolymer, a propylene homopolymer, an ethylene/butene copolymer, an ethylene/hexene copolymer and an ethylene/methacrylate copolymer may be used, or non-woven fabrics made of high melting point glass fiber or the like may be used. Among these, a porous polymer film is preferably used.

When using a polymer film as both a buffer layer and the separator, the amount of electrolyte liquid impregnation and ion conducting properties decline, and effects of reducing an overvoltage and improving capacity properties become insignificant. Meanwhile, when using a non-woven fabric material as the both, mechanical strength is not secured causing a battery short circuit problem. However, when using a film-type separator and a polymer non-woven fabric buffer layer together, mechanical strength may also be secured together with an effect of improving battery performance obtained by employing the buffer layer.

Preferably, in the present invention, an ethylene homopolymer (polyethylene) polymer film is used as the separator, and a polyimide non-woven fabric is used as the buffer layer. Herein, the polyethylene polymer film preferably has a thickness of from 10 μm to 25 μm and porosity of 40% to 50%.

The electrolyte liquid according to the present invention is, as a non-aqueous electrolyte liquid including a lithium salt, formed with a lithium salt and a solvent. The electrolyte liquid has density of less than 1.5 g/cm$^3$. When the electrolyte liquid has density of 1.5 g/cm$^3$ or greater, the lithium-sulfur secondary battery is difficult to accomplish high energy density due to a weight increase in the electrolyte liquid.

The lithium salt is a material that may be readily dissolved in a non-aqueous organic solvent, and examples thereof may include at least one selected from the group consisting of LiCl, LiBr, LiI, LiClO$_4$, LiBF$_4$, LiB$_{10}$Cl$_{10}$, LiB(Ph)$_4$, LiC$_4$BO$_8$, LiPF$_6$, LiCF$_3$SO$_3$, LiCF$_3$CO$_2$, LiAsF$_6$, Li SbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, LiN(C$_2$F$_5$SO$_2$)$_2$, LiN(SO$_2$F)$_2$, chloroborane lithium, lower aliphatic carboxylic acid lithium, lithium tetraphenylborate, and lithium imide. In one specific embodiment of the present invention, the lithium salt may be preferably lithium imide such as LiTFSI.

The concentration of the lithium salt may be from 0.1 M to 8.0 M, preferably from 0.5 M to 5.0 M, and more preferably from 1.0 to 3.0 M depending on various factors such as an accurate composition of the electrolyte liquid mixture, solubility of the salt, conductivity of the dissolved salt, charge and discharge conditions of a battery, a working temperature, and other factors known in the lithium secondary battery field. When the lithium salt concentration is less than the above-mentioned range, conductivity of the electrolyte liquid may decrease causing decline in the battery performance, and when the lithium salt concentration is greater than the above-mentioned range, viscosity of the electrolyte liquid increases leading to a decrease in the lithium ion (Li$^+$) mobility, and therefore, a proper concentration is preferably selected in the above-mentioned range.

The solvent may include a first solvent and a second solvent. The first solvent may have a highest dipole moment per unit volume among the constituents included in an amount of 1% by weight or greater in the solvent, and accordingly, has high dipole moment and low viscosity. Using a solvent with a high dipole moment is effective in improving solid-state reactivity of sulfur, and such an effect may be obtained well when the solvent itself has low viscosity. In the present invention, the first solvent may be classified by a DV$^2$ factor represented by the following Mathematical Formula 2.

$$DV^2 \text{ factor} = \gamma \times \frac{\mu}{DV} \qquad \text{[Mathematical Formula 2]}$$

In Mathematical Formula 2,
DV is a dipole moment per unit volume (D·mol/L),
μ is viscosity of the solvent (cP, 25° C.), and
γ is 100 (constant).

According to the present invention, the DV$^2$ factor value may be 1.75 or less, and preferably 1.5 or less. Although a lower limit of the DV$^2$ factor value is not particularly limited in the present invention, the DV$^2$ factor value may be 0.1 or greater when considering actual driving of the lithium-sulfur secondary battery. When mixing a solvent having a DV$^2$ factor value of 1.75 or less such as the first solvent, battery performance does not decline even when using a positive electrode having low porosity and having a high loading amount of sulfur, a positive electrode active material, in a lithium-sulfur battery since functionality of an electrolyte liquid may be maintained the same.

In the present invention, the first solvent is not particularly limited in the type as long as it has the DV$^2$ factor value included in the above-mentioned range, but may include at least one selected from the group consisting of propionitrile, dimethylacetamide, dimethylformamide, gamma-butyrolactone, triethylamine, and 1-iodopropane.

The first solvent may be included in an amount of from 1% by weight to 50% by weight, preferably in an amount of from 5% by weight to 40% by weight and more preferably in an amount of from 10% by weight to 30% by weight based on the total weight of the solvent forming the electrolyte liquid. When the solvent according to the present invention includes the first solvent in the above-described % by weight range, an effect of improving battery performance may be obtained even when using with a positive electrode having low porosity and a high loading amount of sulfur, a positive electrode active material.

The lithium-sulfur secondary battery of the present invention may be further classified by an NS factor combining the SC factor and the DV$^2$ factor. The NS factor is represented by the following Mathematical Formula 3.

$$NS \text{ factor} = \frac{DV^2 \text{ factor}}{SC \text{ factor}} \qquad \text{[Mathematical Formula 3]}$$

In Mathematical Formula 3,
SC factor has the same value as defined in Mathematical Formula 1, and
DV$^2$ factor has the same value as defined in Mathematical Formula 2.

In the present invention, the NS factor value may be 3.5 or less, preferably 3.0 or less, and more preferably 2.7 or less. Although a lower limit of the NS factor value is not particularly limited in the present invention, the NS factor value may be 0.1 or greater when considering actual driving of the lithium-sulfur secondary battery. When the NS factor value is adjusted to be in the above-mentioned range, an effect of improving performance of the lithium-sulfur secondary battery may be more superior.

In the present invention, the second solvent may be a fluorinated ether-based solvent. In order to control viscosity of an electrolyte liquid in the prior art, solvents such as dimethoxyethane and dimethyl carbonate have been used as a diluent, and when using such a solvent as a diluent, a battery including a high loading and low porosity positive electrode as in the present invention may not be driven. Accordingly, in the present invention, the second solvent may be added with the first solvent in order to drive the positive electrode according to the present invention. The second solvent is not particularly limited in the type as long as it is a fluorinated ether-based solvent generally used in the art, but may include at least one selected from the group consisting of 1H,1H,2'H,3H-decafluorodipropyl ether, difluoromethyl 2,2,2-trifluoroethyl ether, 1,2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

The second solvent may be included in an amount of from 50% by weight to 99% by weight, preferably in an amount of from 60% by weight to 95% by weight, and more preferably in an amount of from 70% by weight to 90% by weight based on the total weight of the solvent forming the electrolyte liquid. When the solvent according to the present invention includes the second solvent in the above-described % by weight range, an effect of improving battery performance may be obtained even when using with a positive electrode having low porosity and a high loading amount of sulfur, a positive electrode active material, like the first solvent. When mixing the first solvent and the second solvent, the second solvent may be included in the electrolyte liquid in the same or more amount compared to the first solvent considering a battery performance improving effect. According to the present invention, the solvent may include the first solvent and the second solvent in a weight ratio of from 1:1 to 1:9 and preferably from 3:7 to 1:9 (first solvent: second solvent).

The non-aqueous electrolyte liquid for a lithium-sulfur battery of the present invention may further include a nitrate or nitrite-based compound as an additive. The nitrate or nitrite-based compound is effective in forming a stable film on the lithium electrode and enhancing charge and discharge efficiency. Such a nitrate or nitrite-based compound is not particularly limited in the present invention, however, one type selected from the group consisting of inorganic-based nitrate or nitrite compounds such as lithium nitrate ($LiNO_3$), potassium nitrate ($KNO_3$), cesium nitrate ($CsNO_3$), barium nitrate ($Ba(NO_3)_2$), ammonium nitrate ($NH_4NO_3$), lithium nitrite ($LiNO_2$), potassium nitrite ($KNO_2$), cesium nitrite ($CsNO_2$), and nitrite ammonium ($NH_4NO_2$); organic-base nitrate or nitrite compounds such as methyl nitrate, dialkyl imidazolium nitrate, guanidine nitrate, imidazolium nitrate, pyridinium nitrate, ethyl nitrite, propyl nitrite, butyl nitrite, pentyl nitrite and octyl nitrite; organic nitro compounds such as nitromethane, nitropropane, nitrobutane, nitrobenzene, dinitrobenzene, nitro pyridine, dinitropyridine, nitrotoluene and dinitrotoluene, and combinations thereof may be used, and preferably, lithium nitrate is used.

In addition, the electrolyte liquid may further include other additives with the purpose of improving charge and discharge properties, flame retardancy and the like. Examples of the additive may include pyridine, triethylphosphite, triethanolamine, cyclic ether, ethylenediamine, n-glyme, hexamethylphosphoric hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride, fluoroethylene carbonate (FEC), propene sultone (PRS), vinylene carbonate (VC) and the like.

The lithium-sulfur secondary battery according to the present invention may be classified by an ED factor value represented by the following Mathematical Formula 4.

$$ED\ factor = V \times SC\ factor \times \frac{C}{D} \quad \text{[Mathematical Formula 4]}$$

In Mathematical Formula 4,
V is a discharge nominal voltage (V) for Li/Li$^+$,
SC factor has the same value as defined in Mathematical Formula 1,
C is discharge capacity (mAh/g) when discharging at a 0.1 C rate, and
D is density (g/cm$^3$) of the electrolyte liquid.

The ED factor may accomplish high energy density in an actual lithium-sulfur secondary battery as the value is higher. According to the present invention, the ED factor value may be 850 or greater, preferably 870 or greater, and more preferably 891 or greater. Although an upper limit of the ED factor value is not particularly limited in the present invention, the ED factor value may be 10,000 or less when considering actual driving of the lithium-sulfur secondary battery. The ED factor value range means that the lithium-sulfur secondary battery according to the present invention is capable of obtaining more enhanced energy density compared to existing lithium-sulfur secondary batteries.

The lithium-sulfur secondary battery of the present invention may be manufactured by interposing a separator between a positive electrode and a negative electrode to form an electrode assembly, placing the electrode assembly in a cylindrical battery case or an angular battery case, and then injecting an electrolyte thereto. Alternatively, the lithium-sulfur secondary battery of the present invention may also be manufactured by laminating the electrode assembly, impregnating the electrode assembly into an electrolyte, and placing the obtained result in a battery case and sealing the result.

In addition, the present invention provides a battery module including the lithium-sulfur secondary battery as a unit cell.

The battery module may be used as a power supply of medium to large-sized devices requiring high-temperature stability, long cycle properties and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including electric bikes (e-bikes) and electric scooters (e-scooters); electric golf carts; systems for power storage, and the like, but are not limited thereto.

MODE FOR INVENTION

Hereinafter, preferred examples will be provided in order to illuminate the present invention, however, the following examples are for illustrative purposes only, and it will be obvious to those skilled in the art that various changes and modifications may be made within the category and technological ideas of the present invention, and such changes and modifications also fall within the scope of the attached claims.

EXAMPLE AND COMPARATIVE EXAMPLE

Example 1

A microporous carbon material having a specific surface area of 2000 m$^2$/g or greater and a pore volume of 1.2 cm$^3$/g or greater, and sulfur (S$_8$) were evenly mixed in a weight ratio of 1:3, the result was ground by mortar mixing, and then placed in a 155° C. oven for 30 minutes to prepare a sulfur-carbon composite.

The sulfur-carbon composite prepared above, a conductive additive and a binder were mixed to prepare slurry for forming a positive electrode active material layer. Herein, the mixing ratio was employed such that the sulfur-carbon composite:the conductive additive:the binder was 90:5:5 in a weight ratio.

The slurry prepared as above was coated on an aluminum foil current collector having a thickness of 20 μm, and then dried to prepare a positive electrode (areal loading of positive electrode: 4.7 mAh/cm$^2$). In the prepared positive electrode, porosity of the positive electrode active material layer calculated using the electrode weight and the electrode thickness (using TESA-pHITE equipment of TESA Technology) was 54%, and the sulfur mass per unit area of the positive electrode active material layer was 2.8 mg/cm$^2$. The SC factor value calculated on the basis of this was 0.52.

The positive electrode prepared using the above-described method, and a negative electrode were placed to face each other, and a separator was interposed therebetween to prepare an electrode assembly. Herein, lithium foil having a thickness of 60 μm was used as the negative electrode, and polyethylene having a thickness of 20 μm and porosity of 45% was used as the separator.

Subsequently, the electrode assembly was placed inside a case, and an electrolyte liquid was injected thereto to manufacture a lithium-sulfur secondary battery. Herein, the electrolyte liquid was prepared by dissolving lithium bis(trifluoromethylsulfonyl)imide (LiTFSI) with a 3 M concentration in an organic solvent, and as the organic solvent, a mixed solvent obtained by mixing propionitrile (first solvent) and 1H,1H,2'H,3H-decafluorodipropyl ether (second solvent) in a 3:7 weight ratio was used. A dipole moment per unit volume was 97.1 D·mol/L in the first solvent, and viscosity (25° C.) of the solvent measured using a LVDV2T-CP viscometer of BROOKFIELD AMETEK, Inc. was 0.38 cP. The $DV^2$ factor value calculated based thereon was 0.39. Charge and discharge of the manufactured battery was conducted at 45° C.

Example 2

A lithium-sulfur secondary battery was manufactured in the same manner as in Example 1 except that, by changing the preparation condition of the positive electrode, a positive electrode in which porosity of the positive electrode active material layer was 54%, the sulfur mass per unit area of the positive electrode active material layer was 4.6 mg/cm$^2$, and the SC factor value calculated based thereon was 0.85 was prepared.

Example 3

A lithium-sulfur secondary battery was manufactured in the same manner as in Example 1 except that, by changing the preparation condition of the positive electrode, a positive electrode in which porosity of the positive electrode active material layer was 53%, the sulfur mass per unit area of the positive electrode active material layer was 3.8 mg/cm$^2$, and the SC factor value calculated based thereon was 0.72 was prepared. Charge and discharge of the manufactured battery was conducted at 25° C.

Example 4

A lithium-sulfur secondary battery was manufactured in the same manner as in Example 1 except that, by changing the preparation condition of the positive electrode, a positive electrode in which a sulfur-carbon composite prepared by evenly mixing carbon nanotubes and sulfur ($S_8$) in a weight ratio of 1:3, grinding the result by mortar mixing, and then placing the result in a 155° C. oven for 30 minutes, and a conductive additive having a form of mixing carbon nanotubes and graphene having a specific surface area of 150 m$^2$/g or greater in a weight ratio of 9:1 were used, and accordingly, areal loading of the positive electrode was 5.45 mAh/cm$^2$, porosity of the positive electrode active material layer was 68%, the sulfur mass per unit area of the positive electrode active material layer was 4.54 mg/cm$^2$, and the SC factor value calculated based thereon was 0.668 was prepared. Charge and discharge of the manufactured battery was conducted at 45° C.

Comparative Example 1

A lithium-sulfur secondary battery was manufactured in the same manner as in Example 3 except that, by changing the preparation condition of the electrolyte liquid, an electrolyte liquid prepared by dissolving 1 M LiTFSI and 1% by weight LiNO$_3$ in an organic solvent formed with diethylene glycol dimethyl ether and 1,3-dioxolane (DECDME: DOL=6:4 (volume ratio) was used.

Comparative Example 2

A lithium-sulfur secondary battery was manufactured in the same manner as in Example 4 except that, by changing the preparation condition of the positive electrode, a positive electrode in which vapor grown carbon fiber (VGCF) was used as the conductive additive, areal loading of the positive electrode was 5.67 mAh/cm$^2$, porosity of the positive electrode active material layer was 68%, the sulfur mass per unit area of the positive electrode active material layer was 4.73 mg/cm$^2$, and the SC factor value calculated based thereon was 0.700 was prepared.

Conditions of the examples and the comparative examples were summarized in the following Table 1.

TABLE 1

| | Electrolyte Liquid Composition | SC Factor | $DV^2$ Factor | NS Factor | ED Factor |
|---|---|---|---|---|---|
| Example 1 | First Electrolyte Liquid Composition[1] | 0.52 | 0.39 | 0.75 | 1201 |
| Example 2 | | 0.85 | 0.39 | 0.46 | 1983 |
| Example 3 | | 0.72 | 0.39 | 0.54 | 1483 |
| Example 4 | | 0.668 | 0.39 | 0.58 | 1188 |
| Comparative Example 1 | Second Electrolyte Liquid Composition[2] | 0.72 | 2.07 | 2.88 | 342 |
| Comparative Example 2 | First Electrolyte Liquid Composition[1] | 0.700 | 0.39 | 0.56 | 1072 |

[1]First Electrolyte Liquid Composition = Propionitrile: 1H,1H,2'H,3H-Decafluorodipropyl ether (3:7, w/w) solvent, 3.0M LiTFSI
[2]Second Electrolyte Liquid Composition = 1,3-Dioxolane: Diethylene glycol dimethyl ether (4:6, v/v) solvent, 1.0M LiTFSI, 1.0 wt % LiNO$_3$ Experimental Example 1. Battery Performance Evaluation For each of the batteries manufactured in Examples 1 to 3 and Comparative Example 1, capacity was measured from 1.0 V to 3.6 V using a charge and discharge measuring device. The results obtained herein are shown in FIG. 1 to FIG. 4.

As shown in FIGS. 1 to 4, it was identified that the batteries including the positive electrode according to the present invention exhibited excellent battery capacity properties compared to the comparative example.

Specifically, it was identified that, whereas the batteries according to Examples 1 to 3 had discharge capacity close to theoretical capacity, Comparative Example 1 using conventional electrolyte liquid exhibited significantly low capacity. From the results, it was identified that the lithium-sulfur secondary battery of the present invention was capable of obtaining higher energy density that was not able to obtain with conventional lithium-sulfur secondary batteries.

Experimental Example 2. Scanning Electron Microscope Analysis

Surface shapes of the positive electrodes prepared in Example 4 and Comparative Example 2 were observed using a scanning electron microscope (SEM). The results obtained herein are shown in FIG. 5 and FIG. 6.

Figure 5:
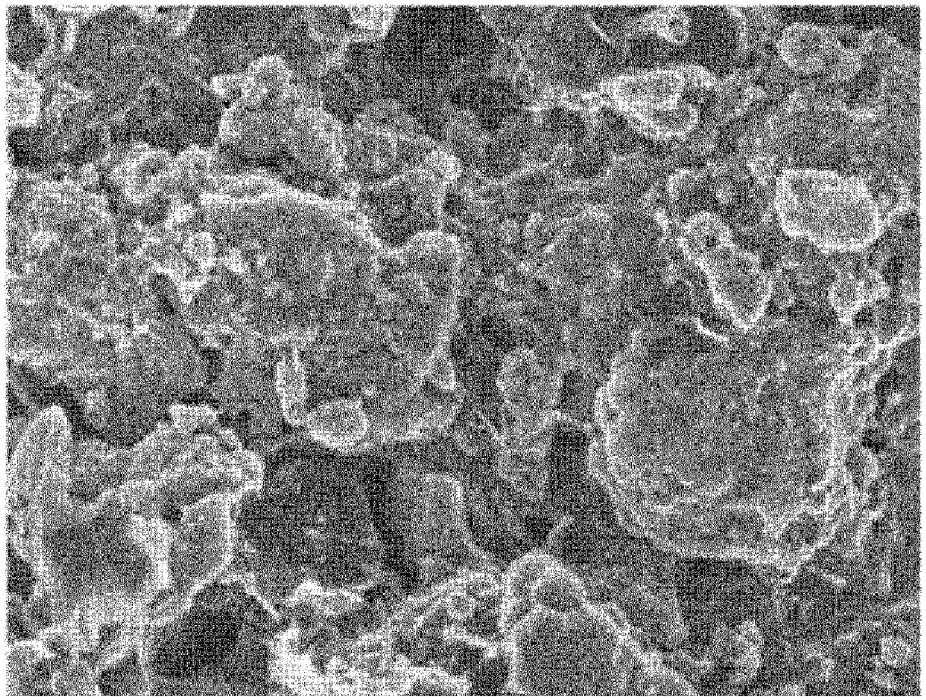
FIG. 5 is a scanning electron microscope image of Example 4 according to Experimental Example 2 of the present invention.
Figure 6:
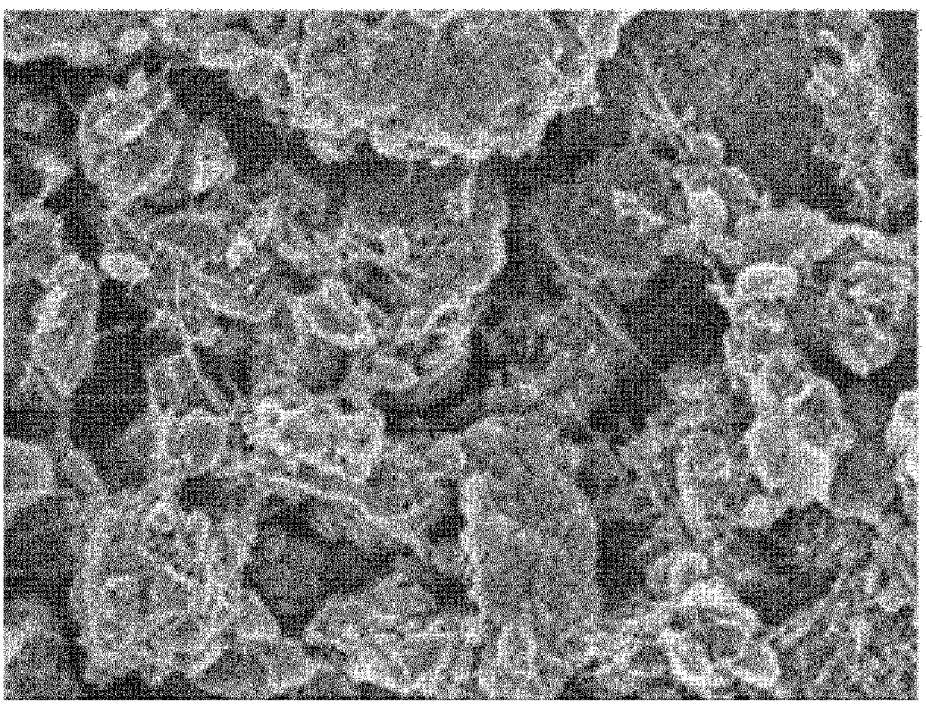
FIG. 6 is a scanning electron microscope image of Comparative Example 2 according to Experimental Example 2 of the present invention.

When referring to FIG. 5 and FIG. 6, it was identified that the conductive structure formation by the conductor was not dense in the positive electrode of Comparative Example 2 compared to in the positive electrode of Example 4.

Experimental Example 3. Battery Performance Evaluation

For each of the batteries manufactured in Examples 4 and Comparative Example 2, capacity was measured from 1.0 V to 3.6 V using a charge and discharge measuring device. In addition, discharge capacity was measured by conducting a cycle consecutively discharging at 0.1 C, 0.2 C rate CC (CC: constant current). The results obtained herein are shown in FIG. 7 to FIG. 10.

As shown in FIGS. 7 to 10, it was identified that the batteries including the positive electrode according to the present invention exhibited excellent capacity properties compared to the comparative example.

Figure 7:
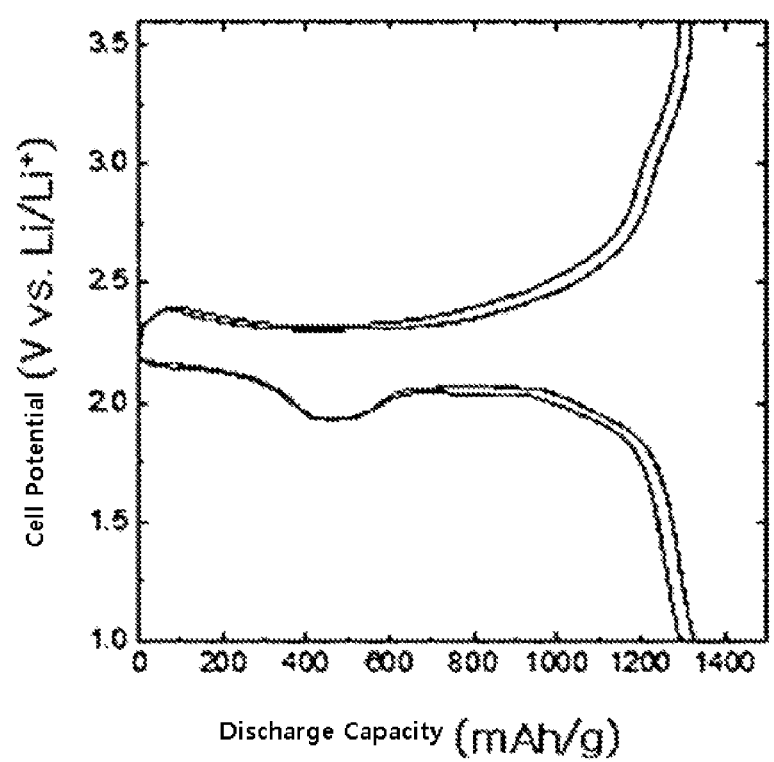
FIG. 7 is a graph showing capacity properties of Example 4 according to Experimental Example 3 of the present invention.
Figure 9:
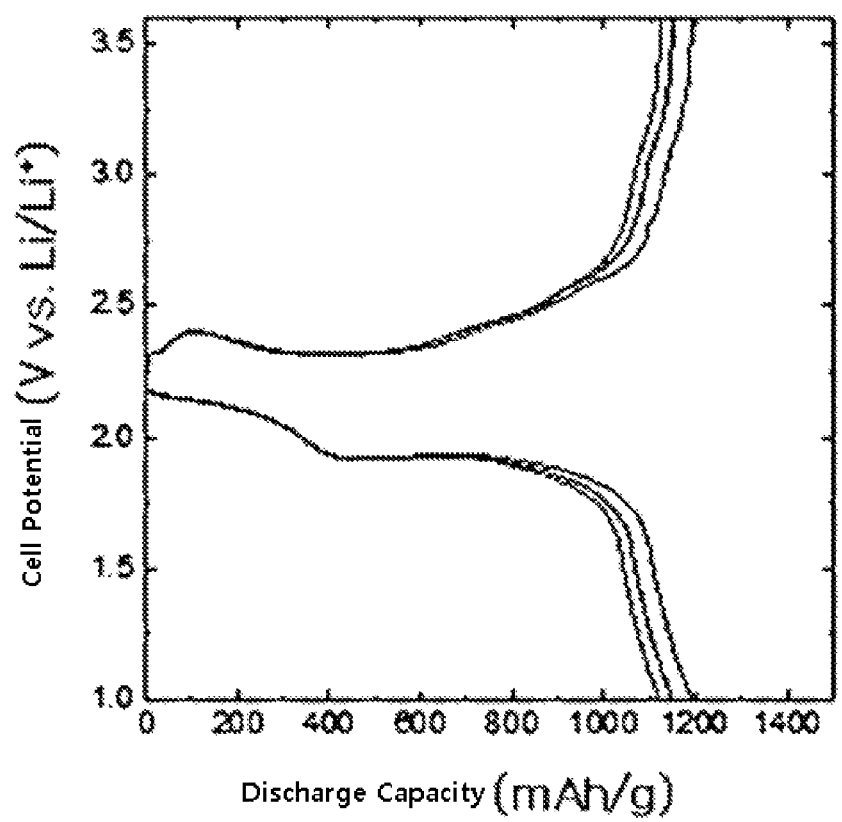
FIG. 9 is a graph showing capacity properties of Comparative Example 2 according to Experimental Example 3 of the present invention.

When referring to FIG. 7 and FIG. 9, it was identified that Comparative Example 2 using a conventional conductive additive exhibited significantly low capacity compared to discharge capacity of the battery according to Example 4.

Figure 8:
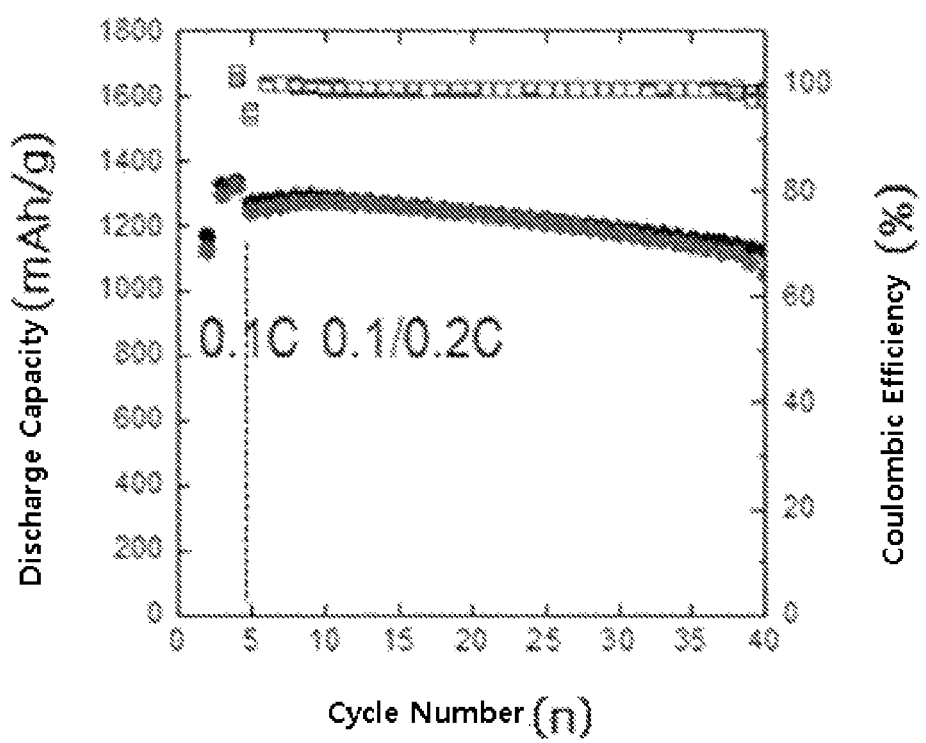
FIG. 8 is a graph showing cycle properties of Example 4 according to Experimental Example 3 of the present invention.
Figure 10:
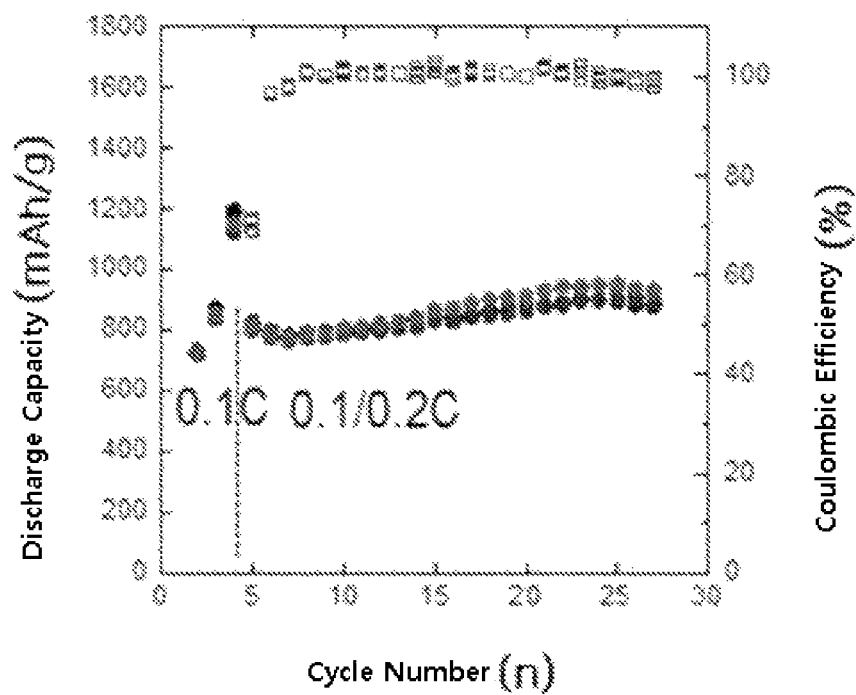
FIG. 10 is a graph showing cycle properties of Comparative Example 2 according to Experimental Example 3 of the present invention.

In addition, through FIG. 8 and FIG. 10, it was identified that the battery including the positive electrode of Example 4 had higher discharge capacity compared to Comparative Example 2 throughout the cycle, and therefore, had an excellent discharge capacity retention rate. From the results, it was identified that the lithium-sulfur secondary battery of the present invention was capable of obtaining higher energy density that was not able to obtain with conventional lithium-sulfur secondary batteries.

The invention claimed is:

1. A lithium-sulfur secondary battery comprising:
a positive electrode comprising a positive electrode active material layer;
a negative electrode;
a separator; and
an electrolyte liquid,
wherein the positive electrode active material layer comprises a sulfur-carbon composite comprising a microporous carbon material and sulfur;
wherein the sulfur of the sulfur-carbon composite is present in an amount of from 50% by weight to 90% by weight based on a total weight of the sulfur-carbon composite,
the positive electrode has an SC factor value represented by the following Mathematical Formula 1 of 0.45 or greater:

$$SC \text{ factor} = \alpha \times \frac{L}{P} \quad \text{[Mathematical Formula 1]}$$

in Mathematical Formula 1,
P is porosity (%) of the positive electrode active material layer;
L is mass of sulfur (mg/cm$^2$) per unit area of the positive electrode active material layer; and
α is 10;
wherein the SC factor defines the relationship between α, P, and L; and
wherein the electrolyte liquid comprises a lithium salt, a first solvent having a DV$^2$ factor value represented by the following Mathematical Formula 2 of 1.75 or less, and a second solvent that is a fluorinated ether-based solvent:

$$DV^2 \text{ factor} = \gamma \times \frac{\mu}{DV} \quad \text{[Mathematical Formula 2]}$$

in Mathematical Formula 2,
DV is a dipole moment per unit volume (D·mol/L);
μ is viscosity of the solvent (cP, 25° C.); and
γ is 100,
wherein the DV$^2$ factor defines the relationship between γ, μ, and DV.

2. The lithium-sulfur secondary battery of claim 1, wherein the microporous carbon material comprises pores having an average diameter of from 1 nm to 10 nm.

3. The lithium-sulfur secondary battery of claim 1, wherein the microporous carbon material has a specific surface area of from 500 m$^2$/g to 4500 m$^2$/g.

4. The lithium-sulfur secondary battery of claim 1, wherein the microporous carbon material has porosity of from 10% to 90%.

5. The lithium-sulfur secondary battery of claim 1, wherein the microporous carbon material has a pore volume of from 0.8 cm$^3$/g to 5 cm$^3$/g.

6. The lithium sulfur secondary battery of claim 1, wherein the positive electrode active material layer further comprises a conductive additive comprising a carbon material having high specific surface area.

7. The lithium-sulfur secondary battery of claim 6, wherein the carbon material having high specific surface area has a specific surface area of from 100 m$^2$/g to 500 m$^2$/g.

8. The lithium-sulfur secondary battery of claim 6, wherein the carbon material having high specific surface area comprises at least one selected from the group consisting of carbon nanotubes, graphene, carbon black, and carbon fiber.

9. The lithium sulfur secondary battery of claim 6, wherein the carbon material having high specific surface area comprises a mixture of carbon nanotubes and grapheme in a weight ratio of from 0:10 to 10:0.

10. The lithium-sulfur secondary battery of claim 6, wherein the carbon material having high specific surface area is present in an amount of from 0.01% by weight to 30% by weight based on a total weight of the positive electrode active material layer.

11. The lithium-sulfur secondary battery of claim 1, wherein the first solvent has a DV$^2$ factor value of 1.5 or less.

12. The lithium-sulfur secondary battery of claim 1, wherein the lithium-sulfur secondary battery has an NS factor value represented by the following Mathematical Formula of 15 or less:

$$NS \text{ factor} = \frac{DV^2 \text{ factor}}{SC \text{ factor}} \quad \text{[Mathematical Formula 3]}$$

in Mathematical Formula 3,
SC factor has the same value as defined in Mathematical Formula 1; and
DV$^2$ factor has the same value as defined in Mathematical Formula 2, wherein the NS factor defines the relationship between $DV^2$ and SC.

13. The lithium-sulfur secondary battery of claim 1, wherein the lithium-sulfur secondary battery has an ED factor value represented by the following Mathematical Formula 4 of 850 or greater:

$$\text{ED factor} = V \times SC \text{ factor} \times \frac{C}{D} \qquad \text{[Mathematical Formula 4]}$$

in Mathematical Formula 4,

V is a discharge nominal voltage (V) for Li/Li$^+$;

SC factor has the same value as defined in Mathematical Formula 1;

C is discharge capacity (mAh/g) when discharging at a 0.1 C rate; and

D is density (g/cm$^3$) of the electrolyte liquid, wherein the ED factor defines the relationship between V, SC factor, C, and D.

14. The lithium-sulfur secondary battery of claim 1, wherein the first solvent comprises at least one selected from the group consisting of propionitrile, dimethylacetamide, dimethylformamide, gamma-butyrolactone, triethylamine, and 1-iodopropane.

15. The lithium-sulfur secondary battery of claim 1, wherein the second solvent comprises at least one selected from the group consisting of 1H,1H2'H,3H-decafluorodipropyl ether, difluoromethyl 2,2,2-trifluomethyl ether, 2,2,2-tetrafluoroethyl trifluoromethyl ether, 1,1,2,3,3,3-hexafluoropropyl difluoromethyl ether, pentafluoroethyl 2,2,2-trifluoroethyl ether, and 1H,1H,2'H-perfluorodipropyl ether.

16. The lithium-sulfur secondary battery of claim 1, wherein the solvent comprises the first solvent in an amount of from 1% by weight to 50% by weight based on a total weight of the solvent.

17. The lithium-sulfur secondary battery of claim 1, wherein the solvent comprises the second solvent, in an amount of from 50% by weight to 99% by weight based on a total weight of the solvent.

18. The lithium-sulfur secondary battery of claim 1, wherein the solvent comprises the first solvent and the second solvent in a weight ratio of from 3:7 to 1:9.

* * * * *